(12) United States Patent
Ge et al.

(10) Patent No.: US 12,211,191 B2
(45) Date of Patent: Jan. 28, 2025

(54) AUTOMATIC INSPECTION USING ARTIFICIAL INTELLIGENCE MODELS

(71) Applicant: Baker Hughes Holdings LLC, Houston, TX (US)

(72) Inventors: Xiaoqing Ge, Houston, TX (US); Dustin Michael Sharber, Houston, TX (US); Jeffrey Potts, Houston, TX (US); Braden Starcher, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 263 days.

(21) Appl. No.: 17/123,928

(22) Filed: Dec. 16, 2020

(65) Prior Publication Data

US 2022/0189005 A1 Jun. 16, 2022

(51) Int. Cl.
| | |
|---|---|
| G06T 7/00 | (2017.01) |
| G06F 18/214 | (2023.01) |
| G06F 18/24 | (2023.01) |
| G06F 18/2431 | (2023.01) |
| G06N 20/00 | (2019.01) |
| G06T 5/50 | (2006.01) |
| G06T 5/70 | (2024.01) |

(52) U.S. Cl.
CPC .......... *G06T 7/0002* (2013.01); *G06F 18/214* (2023.01); *G06F 18/2431* (2023.01); *G06F 18/24765* (2023.01); *G06N 20/00* (2019.01); *G06T 5/50* (2013.01); *G06T 5/70* (2024.01); *G06T 2207/20081* (2013.01)

(58) Field of Classification Search
CPC ............. G06N 3/08; G06N 3/082–084; G06N 3/02–04; G06N 3/0454; G06N 3/088;
(Continued)

(56) References Cited

U.S. PATENT DOCUMENTS

| | | | |
|---|---|---|---|
| 2018/0157899 A1* | 6/2018 | Xu | G06N 3/08 |
| 2019/0139212 A1* | 5/2019 | Hanzawa | G06N 3/08 |

(Continued)

FOREIGN PATENT DOCUMENTS

| | | | | |
|---|---|---|---|---|
| CN | 108280811 A | * | 7/2018 | G06T 5/002 |
| CN | 111024708 A | * | 4/2020 | G01N 21/01 |

(Continued)

OTHER PUBLICATIONS

Badmos et al, "Image-based defect detection in lithium-ion battery electrode using convolutional neural networks", 2019, Journal of Intelligent Manufacturing (2020) 31: 885-897 (Year: 2019).*

X.-Y. Yao, S. Saxena, L. Su and M. G. Pecht, "The Explosive Nature of Tab Burrs in Li-Ion Batteries," in IEEE Access, vol. 7, pp. 45978-45982, 2019 (Year: 2019).*

*Primary Examiner* — Chan S Park
*Assistant Examiner* — Woo C Rhim
(74) *Attorney, Agent, or Firm* — Mintz, Levin, Cohn, Ferris, Glovsky and Popeo, P.C.

(57) ABSTRACT

An inspection method includes receiving a plurality of training images and an image of a target object obtained from inspection of the target object. The method further includes generating, by one or more training codes, a plurality of inference codes. The one or more training codes are configured to receive the plurality of training images as input and output the plurality of inference codes. The one or more training codes and the plurality of inference codes includes computer executable instructions. The method further includes selecting one or more inference codes from the plurality inference codes based on a user input and/or one or more characteristics of at least a portion of the received plurality of training images. The method also includes inspecting the received image using the one or more inference codes of the plurality of inference codes.

17 Claims, 4 Drawing Sheets

(58) Field of Classification Search
CPC .... G06N 20/00–20; G06T 2207/20081; G06T 2207/20084; G06T 7/75; G06T 7/0002–001; G06T 2207/30108; G06V 10/70; G06V 10/82; G06V 10/454; G06V 10/751; G06V 10/98; G06V 10/225; G06V 10/235; G01N 21/88; G01N 21/95; G01N 21/8803; G01N 21/8851; G01N 2021/8854; G01N 2021/8858; G01N 2021/8861; G01N 2021/8864; G01N 2021/888
See application file for complete search history.

(56) References Cited

U.S. PATENT DOCUMENTS

| | | | |
|---|---|---|---|
| 2019/0156524 A1* | 5/2019 | Park | G06T 11/003 |
| 2019/0354850 A1* | 11/2019 | Watson | G06N 3/045 |
| 2020/0078123 A1* | 3/2020 | Venkataraman | A61B 1/00006 |
| 2021/0065053 A1* | 3/2021 | Higgins | G06F 9/542 |
| 2021/0073945 A1* | 3/2021 | Kim | G06T 3/4053 |
| 2021/0209414 A1* | 7/2021 | Tang | G06K 9/6268 |
| 2021/0271912 A1* | 9/2021 | Wu | G06N 3/08 |
| 2021/0326641 A1* | 10/2021 | Tsai | G06V 10/761 |
| 2022/0082508 A1* | 3/2022 | Isken | G01N 21/8422 |
| 2022/0188602 A1* | 6/2022 | Meyer | A61B 5/055 |
| 2022/0245402 A1* | 8/2022 | Tae | G06N 20/00 |
| 2022/0358749 A1* | 11/2022 | Yonetani | G06V 10/774 |

FOREIGN PATENT DOCUMENTS

| | | | | | |
|---|---|---|---|---|---|
| JP | | 4334183 | B2 * | 9/2009 | |
| JP | | 6936957 | B2 * | 9/2021 | ......... G06K 9/00523 |
| JP | | 2021196363 | A * | 12/2021 | |
| WO | WO-2021120186 | A1 * | 6/2021 | | |

* cited by examiner

AUTOMATIC INSPECTION USING ARTIFICIAL INTELLIGENCE MODELS

BACKGROUND

Artificial Intelligence (AI) is a branch of science concerned with building smart machines capable of performing tasks that typically require human intelligence. An AI system can interpret and learn from external data, and achieve specific goals and tasks based on this learning through flexible adaptation. AI systems are becoming increasingly prevalent in fields such as detection systems (e.g., facial recognition), self-driving automobiles, robotics, healthcare etc.

SUMMARY

Various aspects of the disclosed subject matter may provide one or more of the following capabilities.

In one implementation, a method includes receiving a plurality of training images and an image of a target object obtained from inspection of the target object. The method further includes generating, by one or more training codes, a plurality of inference codes. The one or more training codes are configured to receive the plurality of training images as input and output the plurality of inference codes. The one or more training codes and the plurality of inference codes includes computer executable instructions. The method further includes selecting one or more inference codes from the plurality inference codes based on a user input and/or one or more characteristics of at least a portion of the received plurality of training images. The method also includes inspecting the received image using the one or more inference codes of the plurality of inference codes.

One or more of the following features can be included in any feasible combination.

In one implementation, the method further includes receiving the user input indicative of a user request to determine that at least one defect is present or absent in the target object. Selecting one or more inference codes includes selecting a binary discriminator code. The binary discriminator code is configured to output an affirmative inference result indicative of presence of the at least one defect or a negative inference result indicative of absence of the at least one defect. In another implementation, generating the plurality of inference codes includes generating the binary discriminator code by at least identifying a first class of training images from the plurality of training images including an image of the at least one defect; and identifying a second class of training images from the plurality of training images not including an image of the at least one defect. The training code is configured to receive the first and the second class of training images as input and generate the binary discriminator code as an output.

In one implementation, the method further includes receiving the user input indicative of a user request to locate an image of at least one defect in the image of the target object. Selecting one or more inference codes includes selecting a defect localization code. The defect localization code is configured to output a modified image of the target object comprising the received image of the target object and a marker indicative of the at least one defect in target object. In another implementation, generating the plurality of inference codes includes generating the defect localization code by at least selecting a labeled class of training images from the plurality of training images including a label identifying the at least one defect. The training code is configured to receive the labeled class of training images as input and generate the defect localization code as an output. In yet another implementation, the marker includes a polygon surrounding the image of the at least one defect and/or a pixel level mask superimposed on the at least one defect.

In one implementation, the method further includes receiving the user input indicative of a user request to quantify at least one defect in the image of the target object. Selecting one or more inference codes includes selecting a defect quantification code, wherein the defect quantification code is configured to evaluate a severity factor associated with the at least one defect. In another implementation, generating the plurality of inference codes includes generating the defect quantification code by at least generating a mask associated with the at least one defect. The mask is configured to provide pixel-level information associated with the at least one defect.

In one implementation, generating the plurality of inference code includes selecting a plurality of subsets of training images from the plurality of training images. Each subset of the plurality of subsets of training images is used by the one or more training codes to generate a unique inference code of the plurality of inference code. In another implementation, the method further includes generating one or more inference results by the one or more inference codes. Each of the one or more inference codes is configured to generate an inference result. The method also includes generating an inference result ensemble comprising the one or more inference results; and predicting the presence of at least one defect in the target object from the ensemble of inference results. In yet another implementation, predicting the presence of the at least one defect in the target object includes calculating a weighted average of the one or more inference results in the ensemble of inference results.

In one implementation, a denoising code is configured to receive the image of the target object and remove noise characteristics from the received image. In another implementation, the denoising code is trained on a plurality of images generated with at least one imaging parameters within a predetermined range of an inspection imaging parameters associated with the capture of the received image of the target object. In yet another implementation, the noise characteristics include one or more an additive uniform Gaussian noise and a spatially non-uniform Gaussian noise.

In one implementation, the method further includes generating an inspection report including one or more of a result of the inspection of the received images, the plurality of training images and the plurality of inference codes generated by the one or more training codes. In another implementation, the method further includes generating, based on one or more of the result of the inspection of the received images, manufacturing data associated with the target object, material data associated with the target object and design data associated with the target object, guidelines for design and/or manufacturing the target object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Figure 1:
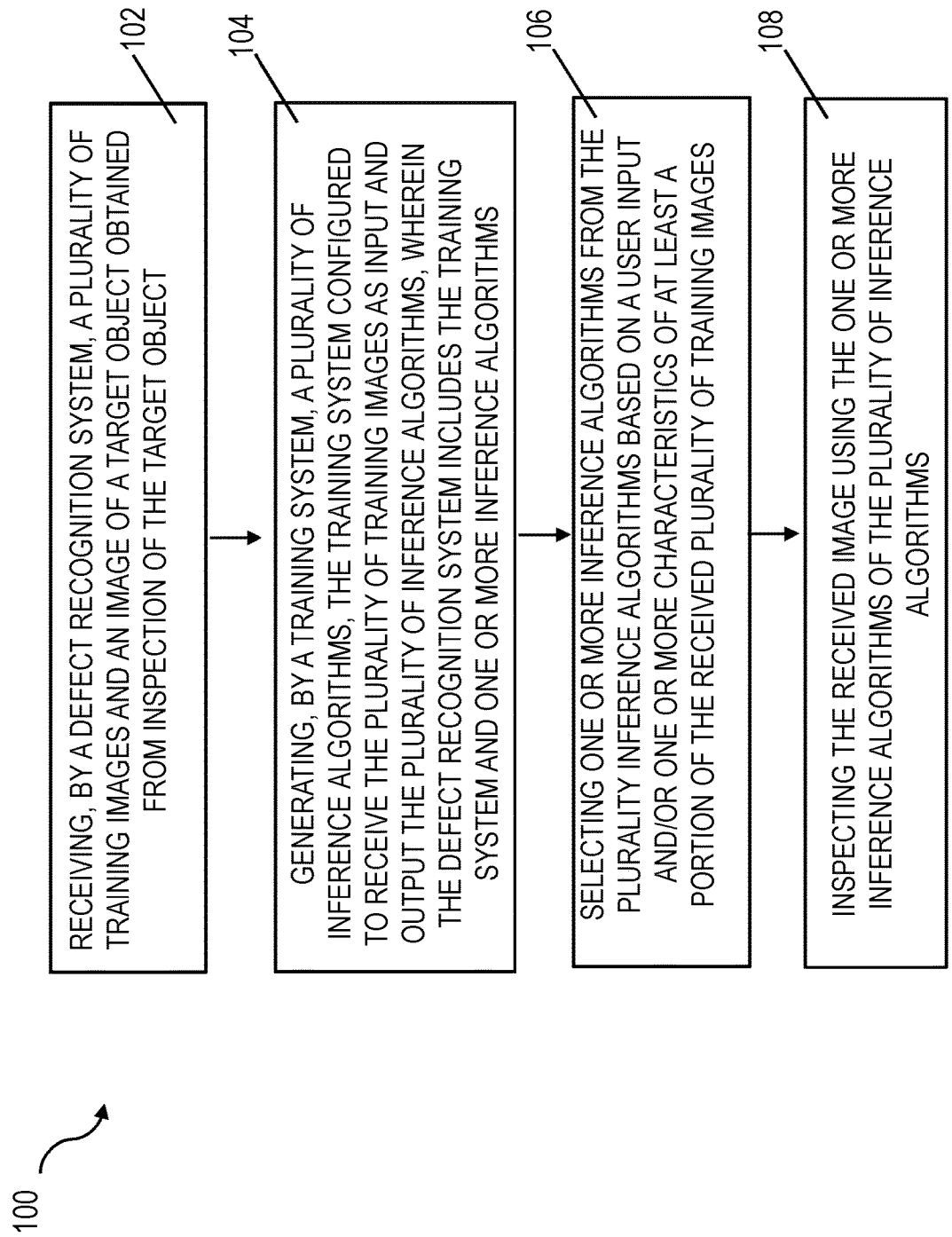
FIG. 1 is a flow chart of an exemplary method for defect detection.

Non-destructive computed-tomography (CT) imaging techniques can be used to inspect various components of industrial machines. For example, CT imaging techniques can be used to inspect industrial machines (e.g., batteries) and identify characteristics in the industrial machines (e.g., detect defects in the batteries). Existing battery inspection systems can rely on traditional image processing to inspect battery images. These inspection systems can be inconsistent (e.g., when inspection is performed on different types of batteries), inefficient (e.g., rely on manual review of large number of battery images) and inaccurate (e.g., when the captured battery images are of poor quality due to short scan times). The current subject matter provides for intelligent defect recognition system that can reduce the inspection time and/or improve inspection accuracy and consistency. In some implementations, the defect recognition system (also referred to as Automatic Defect Recognition [ADR] systems) can include artificial intelligence (AI) models that can one or more of identify, classify, localize and quantify battery defects from CT images of batteries.

In some implementations, the defect detection system can automatically select an AI model (e.g., a deep learning model) from a plurality of AI models based on the type of inspection to be performed (e.g., determination of the presence of a defect, identification of a defect type, determination of a defect characteristic, etc.). The plurality of AI models can be pre-trained and can be included in an AI model library. The various AI models can be trained to detect defect in one or more batteries e.g., batteries of given battery types, battery models, etc.), various scanning environments, defect modes and original equipment manufacturers (OEMs) of batteries. The AI model can be easily adaptable to efficiently and robustly detect a new defect compared to conventional image-processing based approaches. I.

CT imaging techniques can involve a trade-off between the quality of scanned image and the time taken to scan the image (or the cost associated with scanning). In other words, capturing high resolution image may need longer scanning time (which can lead to higher scanning costs) while a fast scan may result in poor image quality. In some implementations, the defect detection system can apply AI based image denoising and upscaling filters on the scanned images. This can allow for defect detection on images that may not be prepared for AI based defect detection using traditional image enhancing techniques. Defect detection that has tolerance of low-quality CT images can lead to lower takt times without sacrificing the detection performance, and resulting in shorter scan times and higher inspection throughput (e.g., defect detection in real time). Due to increased throughput, battery inspection can be performed in-line (e.g., during production) that can result in enhanced safety and provide insights for improvements in the design and manufacturing process of batteries. Additionally or alternately, AI enabled ADR systems can reduce inspection costs while providing comprehensive inspection that can lead to competitive advantage in the growing CT inspection market.

FIG. 1 is a flow chart of an exemplary method for defect detection by a defect recognition system. At step 102, data characterizing a plurality of training images and an image of a target object (e.g., a battery) obtained from inspection of the target object can be received (e.g., by a defect recognition system). The plurality of training images can be generated by a data preparation system (not shown) and transmitted to the defect recognition system. The training images can include images of various objects (e.g., various batteries) that are annotated. For example, various features (e.g., defects) of the objects can be labelled. The generation of training images is described in application Ser. No. 17/118,566 titled "DATA PREPARATION FOR ARTIFICIAL INTELLIGENCE MODELS," the entire contents of which are hereby expressly incorporated by reference herein.

Figure 2:
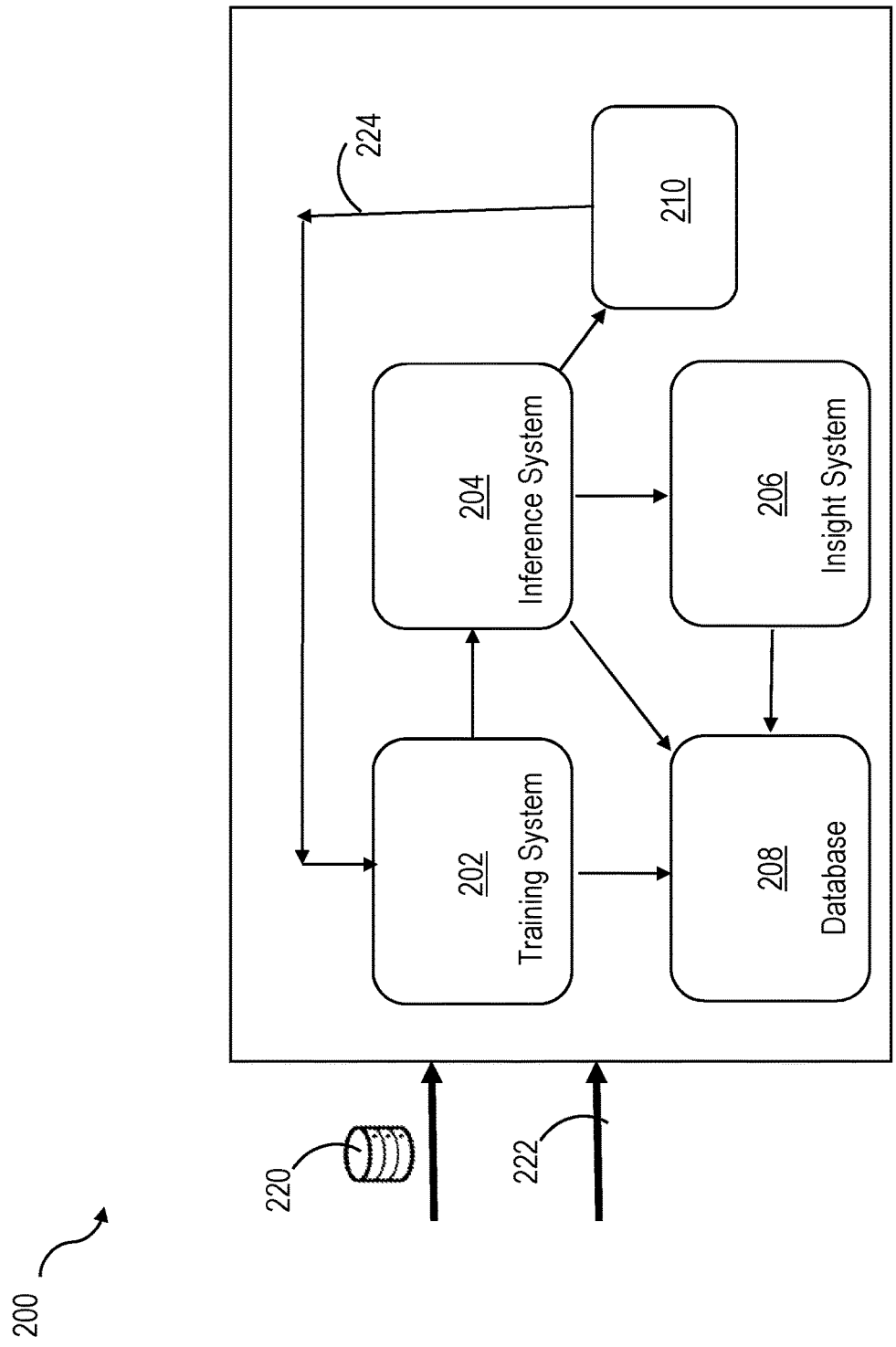
FIG. 2 is a schematic illustration of an exemplary defect recognition system.

FIG. 2 is a schematic illustration of an exemplary defect recognition system 200 that includes a training system 202, an inference system 204, an insight system 206, a database 208 and a performance monitoring system 210. The defect recognition system 200 can be configured to receive the plurality of training images 220 (e.g., at step 102). The training system 202 can include one or more training algorithms. Returning to FIG. 1, at step 104, a plurality of inference algorithms (e.g., AI computer vision models, deep learning algorithms) can be generated by one or more training algorithms that can receive the plurality of training images as input and generate the plurality of inference algorithms as output. In some implementations, a given training algorithm can generate/train an inference algorithm by determining one or more coefficients in the inference algorithm. For example, the training algorithm can include an optimization algorithm that can determine (e.g., by searching) for inference algorithm coefficients (e.g., neural network parameters) by reducing (e.g., minimizing) the difference between a predicted characteristics (predicted by the inference algorithm) and actual characteristic ("ground truth") of the training image. This some implementations, the search for inference algorithm coefficients can be performed, for example, by Stochastic Gradient Descent (or variations thereof). The inference system 204 can include the plurality of inference algorithms generated at step 104. In some implementations, a given training algorithm can be configured to generate a unique inference algorithm (e.g., based on a subset of the training images received at step 102). For example, each training algorithm can be configured to generate a unique inference algorithm.

At step 106 one or more inference algorithms can be selected from the plurality inference algorithms based on a user input 222 and/or one or more characteristics of the plurality of training images received at 102. In some implementations, a user can provide the user input 222 requesting a binary determination associated with a defect (e.g., whether the defect(s) of a certain type (or having certain characteristics) is present or absent in the target object). In some implementations, the battery defect characteristic can include one or more of electrode geometry overhang, delamination, foreign materials in the battery, welding defects, assembly defects, etc. Based on this request a binary discriminator inference algorithm can be selected from the plurality of inference algorithms in the inference system 204. The binary discriminator inference algorithm can be configured to output an affirmative inference result indicative of presence of the defect(s) or a negative inference result indicative of absence of the defect(s). In some implementations, the binary discriminator inference algorithm can include multi-class classification. For example, in addition to determining whether the defect is present, the class/type of the identified defect can be determined.

In some implementations, a first training algorithm in the training system 202 can be configured to generate the binary discriminator inference algorithm (e.g., prior to receiving the user input 222). The first training algorithm can generate the binary discriminator inference algorithm based on classification of the training images 220 (or a portion thereof) into two classes. For example, a first class of training images from the plurality of training images 220 that include an image of a defect (e.g., image of the defect identified in user input 222) can be identified. A second class of training images from the plurality of training images 220 that do not include an image of the defect can be identified. Determination of the two classes of training images can be done, for example, by searching for the defect in the annotations/labels of the training images 220. In some implementations, the classification of the training images can be performed by a separate classification system (not shown), and the classified images can be received by the first training algorithm as input. The first training algorithm can generate the binary discriminator inference algorithm as an output. Alternately, the first training algorithm can be configured to perform both the classification and the generation of the binary discriminator inference algorithm.

In some implementations, a user can provide the user input 222 with a request to locate a defect in the image of the target object received at step 102. Based on this request a defect localization inference algorithm can be selected from the plurality of inference algorithms in the inference system 204. The defect localization inference algorithm can be configured to output a modified image of the target object that includes the received image of the target object and a marker indicative of the defect identified in the user input 222.

In some implementations, a second training algorithm can be configured to generate the defect localization inference algorithm (e.g., prior to receiving the user input 222). The second training algorithm can generate the defect localization inference algorithm by selecting a subset of training images from the plurality of training images 220 that include the defect identified in the user input 222. This can be done, for example, by searching of the identified defect in the annotation/labels of the training images 220. Alternately, a separate identification system can select the subset of training images that include the identified defect. The second training algorithm can then generate the defect localization inference algorithm based on the subset of training images that include the identified defect. In some implementations, the labels in the training image can include a marker that can identify the defect in the training image. The maker can include the information associated with the defect (e.g., name of the defect, class of the defect, etc.). In some implementations, the marker can include a bounding box (e.g., a polygon, a pixel-level mask) superimposed on the training images in the subset of training images. The bounding box characteristics (e.g., shape size, color, etc.) can vary based on the defect it is configured to identify in the training image.

In some implementations, a user can provide the user input 222 with a request to quantify a defect in the image of the target object received at step 102. Based on this request, a quantification inference algorithm can be selected from the plurality of inference algorithms in the inference system 204. The quantification inference algorithm can be configured to evaluate a severity factor associated with the defect identified in the user input 222. In some implementations, generating the defect quantification algorithm can include generating a mask associated with the identified defect. The mask can be configured to provide pixel-level information associated with the identified defect. In some implementations, masks can be used to calculate an area of the defect that can quantify the severity (e.g., size of the area can be proportional to the severity factor associated with the defect). In some implementations, masks can be used to detect characteristics of the batteries that can be indicative of presence of the defects.

In some implementations, selection of the one or more inference algorithm can be based on characteristics of one or more training images received at step 102. For example, the training images can be annotated to indicate the type of inference algorithm that can inspect the training images. Additionally or alternatively, selection of the inference algorithm can be based on analysis of the annotations of the training images.

At step 108, image of the target object received at step 102 can be inspected using the one or more inference algorithms generated by the training system 202 (e.g., one or more of binary discriminator inference algorithm, defect localization inference algorithm, quantification inference algorithm, etc.). The inference algorithm can receive the image of the target object as an input and output one or more characteristic of the image of the target object. The output characteristics can be based on the request in user input 222. For example, if user input 222 includes a request for binary determination of the defect, the output of the selected binary discriminator inference algorithm can include an affirmative inference value indicative of presence of the defect(s) or a negative inference value indicative of absence of the defect(s). Additionally or alternatively, if user input 222 includes a request to locate a defect in the image of the target object, the output of the selected defect localization inference algorithm can include a modified image of the target object that includes the received image of the target object and a marker indicative of the defect identified in the user input 222.

Additionally or alternatively, if user input 222 includes a request to quantify a defect in the image of the target object, the output of the selected quantification inference algorithm can include a severity factor associated with the defect identified in the user input 222. In some implementations, the severity factor can be indicative of the impact of the defect on the operation of the target object (e.g., impact of the defect on the operation of the battery). For example, the severity factor can be a value from a predetermined value range where each value of the values in the predetermined value range indicates of the degree of impact/threat of the defect on the target object.

In some implementations, the inference system 204 can include an image modification algorithm that can modify the images of the target object configured to be inspected by the defect recognition system 200. The image modification algorithm can include a denoising/upscaling algorithm. The denoising/upscaling algorithm receives the image of the target object and removes noise characteristics from the received image. The noise characteristics can include noise introduced to the target object image during its acquisition. For example, if the scan time of the target object is small, the resulting image can be blurry (e.g., may not have desirable sharpness/contrast). This may inhibit the ability of the inference system 204 from detecting/identifying defects in the image.

In some implementations, the denoising/upscaling algorithm can include AI models (e.g., deep learning networks) trained on a dataset of noisy images and configured to identify and/or filter out noise characteristics from the image. The noise characteristics can include, for example, additive uniform Gaussian noise, spatially non-uniform Gaussian noise, etc. In some implementations, the denoising/upscaling algorithm can be trained on noisy images generated under conditions having one or more parameters in common with the inspection parameters (e.g., within a predetermined range from the inspection parameters) associated with the capture of the image of the target object received at step 102. The inspection parameters can include, for example, properties of the electromagnetic radiation (e.g., intensity, beam properties, etc.) used in CT imaging, the type of battery under inspection, etc. In some implementations, the denoising/upscaling algorithm can be trained on noisy images from the inspection device capturing the images of the target object. As a result, it can be trained to identify and remove inspection noise generated by the inspection device.

Figure 3:
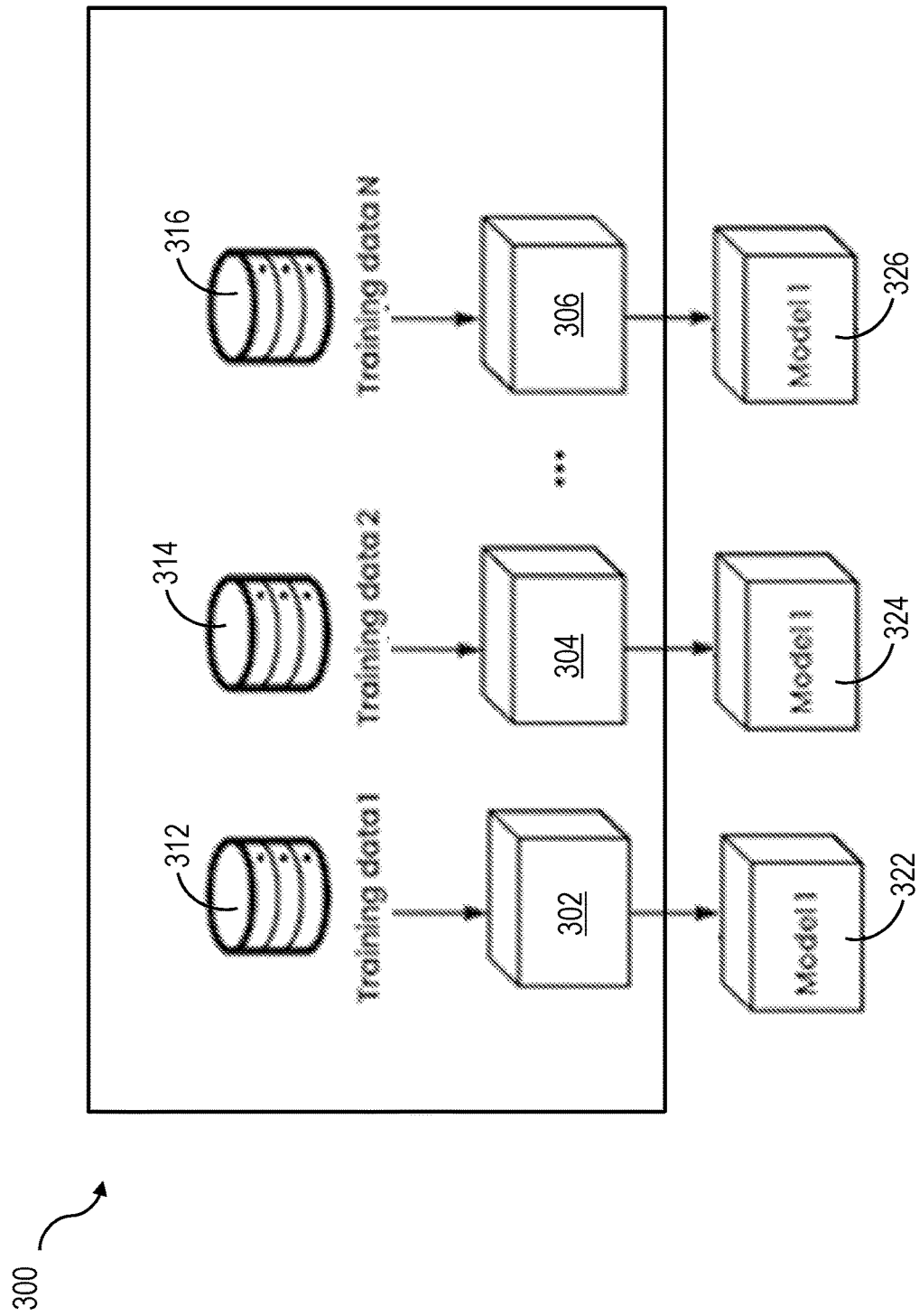
FIG. 3 is a schematic illustration of an exemplary training system in the defect recognition system of FIG. 2.

FIG. 3 is a schematic illustration an exemplary training system 300 that can include a plurality of training algorithms 302, 304 and 306. FIG. 3 is an exemplary illustration and the training system 300 can include two or more training algorithms. In some implementations, a plurality of subsets of training images 312, 314 and 316 can be selected from the training images (e.g., plurality of training images received at step 102). A given training algorithm can receive a subset of training images and generate an inference algorithm. For example, training algorithms 302, 304 and 306 can receive the subset of training images 312, 314 and 316, respectively, and can generate inference algorithms 322, 324 and 326, respectively.

Figure 4:
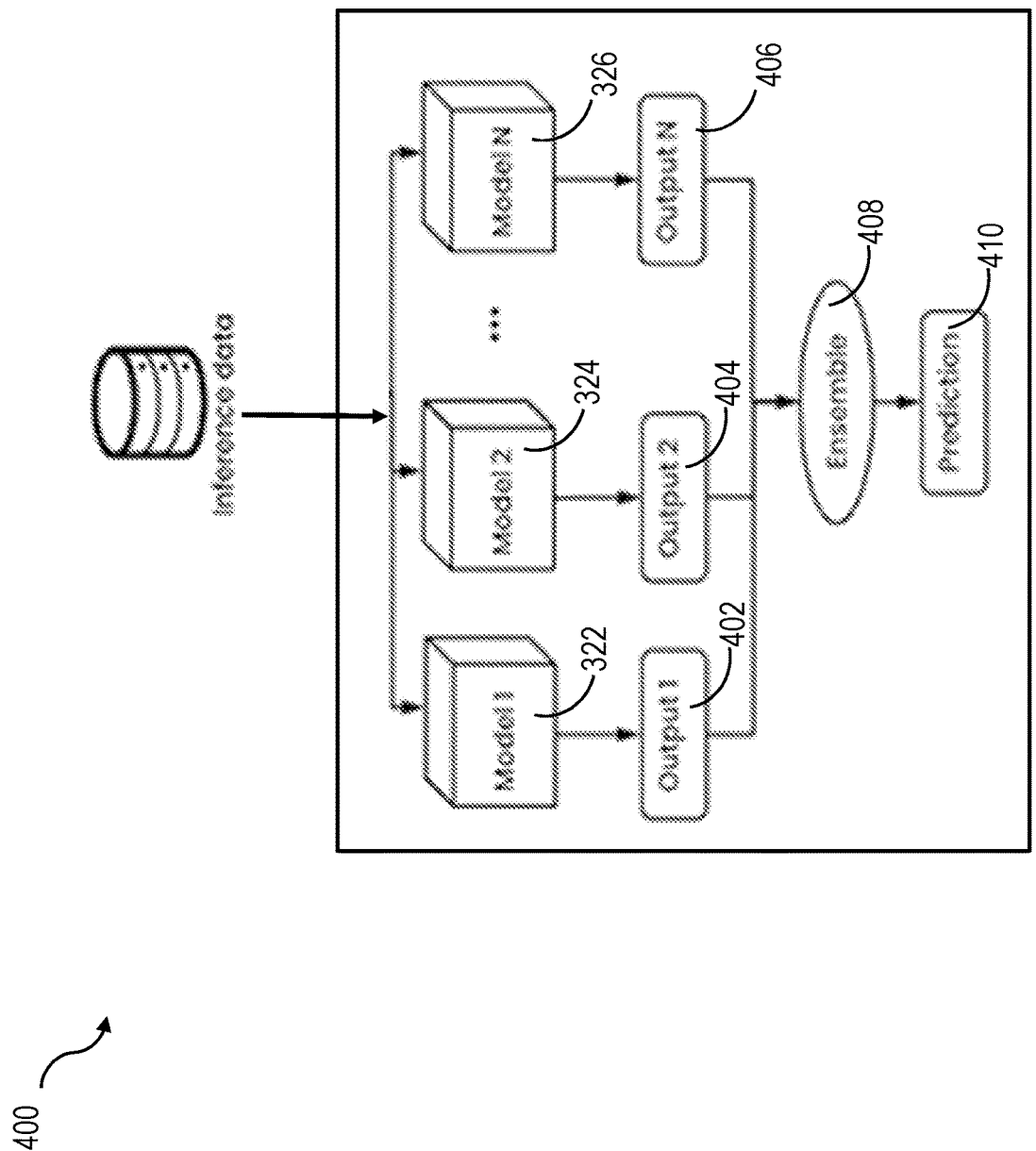
FIG. 4 is a schematic illustration of an exemplary inference system in the defect recognition system of FIG. 2.

FIG. 4 is a schematic illustration of an exemplary inference system 400 that can include the plurality of inference algorithms 322, 324 and 326 generated by the exemplary training system 300 in FIG. 3. FIG. 4 is an exemplary illustration and the inference system 400 can include two or more inference algorithms. The plurality of inference algorithms 322, 324 and 326 can receive inference data (e.g., image of the target object received at step 102) and generate inference results (e.g., first output characteristic 402, second output characteristic 404 and third output characteristic 406, respectively). An ensemble of inference results 408 can be generated by combining the inference results from the various inference algorithms 322, 324 and 326. A defect prediction/inference on the defect (e.g., whether the defect(s) of a certain type (or having certain characteristics) is present or absent in the target object, location of the defect in the image of the target object, quantification of defect properties, etc.), can be made from the ensemble of inference results. For example, the various inference results in the ensemble 408 can be assigned a weight, and a weighted average of the inference results in the ensemble can be calculated. The prediction can be made based on the weighted average. In one implementation, if a predetermined number of inference results in the ensemble (e.g., a majority) indicate that a defect is present, the inference system 400 can conclude that the defect is present. In some implementations, the defect prediction can be made by a voting algorithm that can pick an inference result from the ensemble 408.

Returning to FIG. 2, the performance of the inference algorithm(s) in the inference system 204 can be evaluated. If the performance of the inference algorithm(s) is not desirable, the inference algorithm(s) can be retrained. In some implementation, the performance monitoring system 210 can monitor the performance of the inference algorithm(s). For example, the output of the inference algorithm(s) (e.g., one or more characteristics of the image of the target object inferred by the inference algorithm(s)) can be presented to a user. Additionally or alternately, the performance monitoring system 210 can generate performance metric indicative of the performance of the inference algorithm(s). In some implementations, this can be done, by performing inspection of an image by the inference algorithm(s) whose characteristics are known (or ground truths), and comparing the inferred characteristics with the ground truths. The performance metric and/or the inferred characteristics can be presented to a user (e.g., via a GUI) . . . . If the user determines that inference algorithm is nor performing as desired (e.g., when values of the performance metrics and/or the inferred characteristics are outside an error tolerance range), the user can provide an input (e.g., via the GUI) indicating that the inference algorithm(s) needs to be retrained. Based on the user's input, the training algorithm(s) can retrain the inference algorithm(s) (e.g., by recalculating coefficients in the inference algorithm, neural network parameters, etc.). For example, a feedback signal 224 can be transmitted by the performance monitoring system 210 to the training system 202 that can instruct the latter to retrain the inference algorithm(s).

The output characteristic(s) associated with the image of the target object that is generated by inference system 202 can be received by the insight system 206. The insight system can generate an inspection report that can include one or more of inference results of the inspection of the received images (e.g., output characteristic(s) of the image of the target object from the inference system 202). In some implementations, the inspection report can include training images (e.g., training images received at step 102 or a portion thereof) and/or the plurality of inference algorithms generated by the training codes. In some implementations, the inspection report can include inspection parameters associated with the capture of the image of the target object (e.g., received by the defect recognition system 200 from the inspection site). The insight system 206 may include analytics algorithms that can analyze outputs of the insight system 204, data included in the inspection report, etc. The analytics algorithm may estimate the root cause of the defect in the battery and/or predict battery run-life. In some implementations, the inference results (or output characteristics from the inference algorithms) can be meshed with results of the analytics algorithm and other material/design/manufacturing data (e.g., stored in database 210) database to discover underlying trends, patterns, and correlations (e.g., via a statistical analysis). The inspection report and/or the results of the analytics algorithm can improve the battery inspection process, battery design and manufacturing process. For example, the analytics algorithm can generate guidelines for manufacturing the battery (e.g., guidelines for improving the manufacture of the battery).

Data associated with the inference system 204 (e.g., characteristics output, inference algorithm(s), etc.), insight system 206 (e.g., inspection report, output of analytics algorithm, etc.), training system 202 (e.g., training images, training algorithms(s), etc.) can be stored in the database 208. In some implementations, the defect detection described above can be distributed. For example, operations such as data collection (e.g., collection of training images 220, image of the target object for inference), inference on target object images (e.g., by the inference system 204), detection visualization (e.g., presentation of the detected defect to a user), and storage of data (e.g., by database 208) can be performed at the battery inspection site. Other operations, such as, such as data preparation (e.g. for the training algorithms in the training system 202), insight generation (e.g., generation of insight report, execution of insight analytics, etc.) can be performed on the battery inspection site or on the cloud. The decision to distribute the operations on premise and off-premise can be based on data privacy, connectivity and storage capacity.

Other embodiments are within the scope and spirit of the disclosed subject matter. For example, the monitoring system described in this application can be used in facilities that have complex machines with multiple operational parameters that need to be altered to change the performance of the machines (e.g., power generating turbines). Usage of the word "optimize"/"optimizing" in this application can imply "improve"/"improving."

Certain exemplary embodiments are described herein to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a programmable Graphics Processing Unit (GPU), a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network. An algorithm can include a computer program. An algorithm can include computer executable instructions (e.g. that can be executed by a processor).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors and/or GPUs suitable for the execution of a computer program include, by way of example, both general and special purpose microprocessors, and any one or more processor of any kind of digital computer. Generally, a processor will receive instructions and data from a Read-Only Memory (ROM) or a Random Access Memory (RAM) or both. For example, ROM and/or RAM can include supporting drives/software that can allow for improved (e.g., optimized) performance of the Processors and/or GPUs. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    determining a type of inspection to be performed on a target object;
    selecting a single pre-trained training model from a plurality of pre-trained training models based on the type of inspection to be performed and a defect type to be detected of a plurality of defect types;
    receiving, by the single pre-trained training model, a plurality of training images and an image of the target object, the image being obtained from inspection of the target object using computer tomography imaging techniques;
    generating, by the pre-trained training model, a plurality of inference algorithms, the pre-trained training model being configured to receive the plurality of training images as input and to output the plurality of inference algorithms, wherein the pre-trained training model and the plurality of inference algorithms comprise computer executable instructions;
    selection of selecting an inference algorithm from the plurality of inference algorithms based on one or more characteristics of at least a portion of the plurality of training images and the defect type, wherein the selected inference algorithm is configured to detect a presence of the defect type of a plurality of defect types;
    performing the determined type of inspection on the image of the target object using the selected inference algorithm; and
    outputting an affirmative inference result indicative of presence of the defect type or a negative inference result indicative of absence of the defect type.

2. The method of claim 1, wherein generating the plurality of inference algorithms comprises generating a binary discriminator code by at least:
    identifying a first class of training images from the plurality of training images comprising an image of the defect type; and
    identifying a second class of training images from the plurality of training images excluding an image of the defect type,
    wherein the pre-trained training model is configured to receive the first and the second class of training images as input and generate the binary discriminator algorithm as an output.

3. The method of claim 1, wherein the selected inference algorithm is a defect localization algorithm, the method further comprising receiving a second user input indicative of a user request to locate an image of at least one defect in the image of the target object, wherein the defect localization algorithm is configured to output a modified image of the target object comprising the image of the target object and a marker indicative of the at least one defect in target object.

4. The method of claim 3, wherein generating the plurality of inference algorithms comprises generating the defect localization code by at least:
    selecting a labeled class of training images from the plurality of training images comprising a label identifying the defect type,
    wherein the pre-trained training code is configured to receive the labeled class of training images as input and generates the defect localization algorithm as an output.

5. The method of claim 3, wherein the marker comprises a polygon surrounding the image of the at least one defect and a pixel level mask superimposed on the at least one defect.

6. The method of claim 1, wherein the selected inference algorithm is a defect quantification algorithm, the method further comprising receiving a second user input indicative of a user request to quantify at least one defect in the image of the target object, wherein the defect quantification algorithm is configured to evaluate a severity factor associated with the at least one defect.

7. The method of claim 6, wherein generating the plurality of inference algorithms comprises generating the defect quantification algorithm by at least:
    generating a mask associated with the at least one defect, wherein the mask is configured to provide pixel-level information associated with the at least one defect.

8. The method of claim 1, receiving the image of the target object, by a denoising algorithm configured to remove noise characteristics from the image.

9. The method of claim 8, wherein the denoising algorithm is trained on a plurality of images generated with at least one imaging parameters within a predetermined range of an inspection imaging parameters associated with a capture of the image of the target object.

10. The method of claim 8, wherein the noise characteristics comprise one or more of an additive uniform Gaussian noise and a spatially non-uniform Gaussian noise.

11. The method of claim 1, further comprising generating an inspection report comprising one or more of a result of the inspection of the images, the plurality of training images and the plurality of inference algorithms generated by the pre-trained training model.

12. The method of claim 1, further comprising generating, based on one or more of a result of the inspection of the images, manufacturing data associated with the target object, material data associated with the target object and design data associated with the target object, guidelines for design and manufacturing the target object.

13. The method of claim 1, wherein the target object is a battery, and the defect type comprises one or more of an electrode geometry overhang, a delamination, a foreign material in the battery, a welding defects or an assembly defect.

14. A system comprising:
at least one data processor;
a memory coupled to the at least one data processor, the memory storing instructions to cause the at least one data processor to perform operations comprising:
   determining a type of inspection to be performed on a target object;
   selecting a single pre-trained training model from a plurality of pre-trained training models based on the type of inspection to be performed, wherein the pre-trained training model is selected based on a defect type to be detected of a plurality of defect types;
   receiving, by the single pre-trained training model, a plurality of training images and an image of the target object, the image being obtained from inspection of the target object using computer tomography imaging techniques;
   generating, by the pre-trained training model, a plurality of inference algorithms, the pre-trained training model being configured to receive the plurality of training images as input and to output the plurality of inference algorithms, wherein the pre-trained training model and the plurality of inference algorithms comprise computer executable instructions;
   selecting an inference algorithm from the plurality of inference algorithms based on one or more characteristics of at least a portion of the plurality of training images and the defect type to be determined, wherein the selected inference algorithm is configured to detect a presence of the defect type;
   performing the determined type of inspection on the image of the target object using the selected inference algorithm; and
   outputting an affirmative inference result indicative of presence of the defect type or a negative inference result indicative of absence of the defect type.

15. The system of claim 14, wherein generating the plurality of inference algorithms comprises generating a binary discriminator algorithm by at least:
   identifying a first class of training images from the plurality of training images comprising an image of the defect type; and
   identifying a second class of training images from the plurality of training images excluding an image of the defect type;
   wherein the pre-trained training model is configured to receive the first and the second class of training images as input and generate the binary discriminator algorithm as an output.

16. The system of claim 14, wherein the target object is a battery, and the defect type comprises one or more of an electrode geometry overhang, a delamination, a foreign material in the battery, a welding defects or an assembly defect.

17. A computer program product comprising a non-transitory machine-readable medium storing instructions that, when executed by at least one programmable processor that comprises at least one physical core and a plurality of logical cores, cause the at least one programmable processor to perform operations comprising:
   determining a type of inspection to be performed on a target object;
   selecting a single pre-trained training model from a plurality of pre-trained training models based on the type of inspection to be performed, wherein the pre-trained training model is selected based on a defect type to be detected of a plurality of defect types;
   receiving, by the single pre-trained training model, a plurality of training images and an image of the target object, the image being obtained from inspection of the target object using computer tomography imaging techniques;
   generating, by the pre-trained training model, a plurality of inference algorithms, the pre-trained training model being configured to receive the plurality of training images as input and to output the plurality of inference algorithms, wherein the pre-trained training model and the plurality of inference algorithms comprise computer executable instructions;
   of selecting an inference algorithm from the plurality of inference algorithms based on one or more characteristics of at least a portion of the plurality of training images and the defect type to be determined based on the type of inspection to be performed, wherein the selected inference algorithm is configured to detect a presence of the defect type of a plurality of defect types;
   performing the determined type of inspection on the image of the battery using the selected inference code; and
   outputting an affirmative inference result indicative of presence of the defect type or a negative inference result indicative of absence of the defect type.

* * * * *